March 24, 1970  T. J. BRESSICKELLO  3,502,020
FOOD DISPLAY AND WARMING DEVICE
Filed March 4, 1968  2 Sheets-Sheet 2

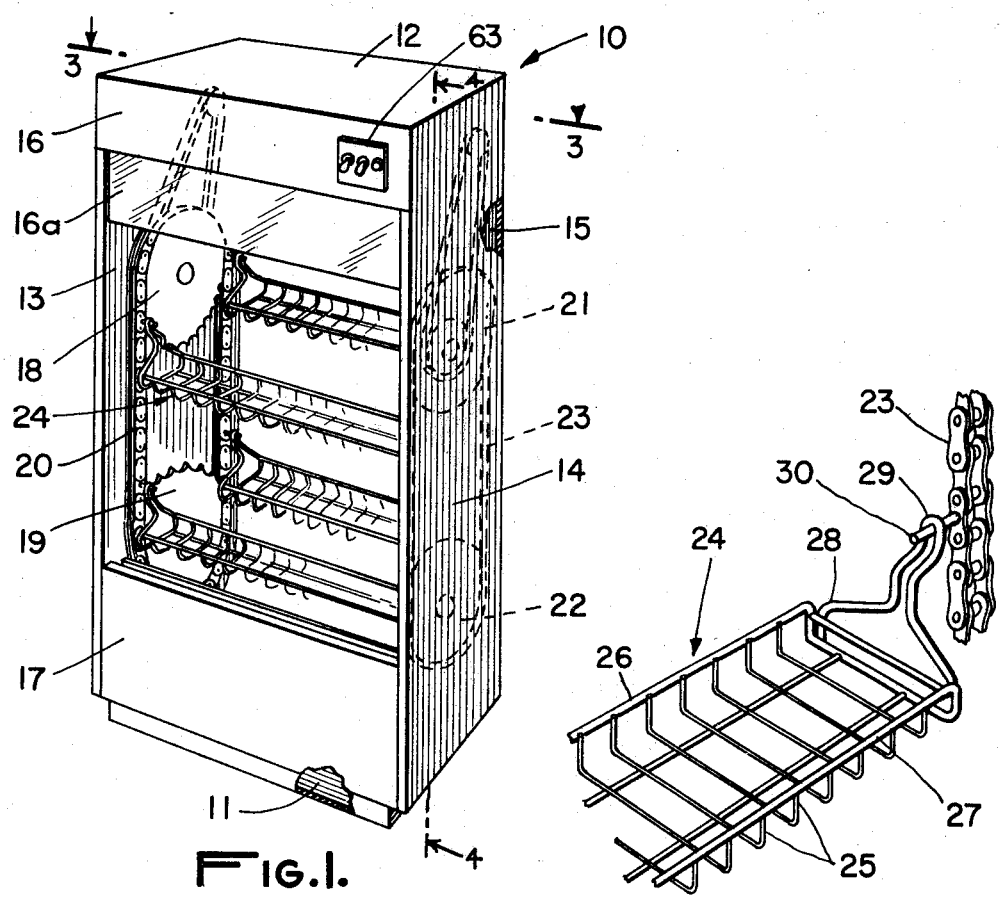

INVENTOR.
TONY J. BRESSICKELLO
BY
Elliott & Pastoriza
ATTORNEYS

United States Patent Office 3,502,020
Patented Mar. 24, 1970

3,502,020
FOOD DISPLAY AND WARMING DEVICE
Tony J. Bressickello, 13015 S. Normandie Ave., Gardena, Calif. 90249
Filed Mar. 4, 1968, Ser. No. 710,092
Int. Cl. A47j 37/04
U.S. Cl. 99—443
2 Claims

ABSTRACT OF THE DISCLOSURE

The invention includes a display cabinet having a conveyor assembly therein which includes a plurality of trays adapted for holding food products. The conveyor assembly is power driven to continuously move the trays past a frontal access opening in the cabinet. The device includes a heater within the cabinet for maintaining the food products in a heated condition. The device further includes a system within the cabinet for continuously directing a curtain of heated air upwardly between the trays and the access opening for preventing escape of heat from the cabinet.

---

This invention relates generally to food display devices and more particularly to a device for displaying hot foods so that a consumer may select and remove food therefrom.

It is a primary object of the invention to provide a display device for food products which provides convenient accessibility to the food products therein.

It is another object to provide a food display device which maintains the food products in a heated condition.

More particularly, it is an object to provide a food display and warming device which continuously moves the food products past an access opening so that the consumer dose not have to move or rearrange the food products to view and select the same.

It is still another object to provide a food display and warming device which reduces the loss of heat from the device to an acceptable minimum.

Briefly, these and many other objects and advantages of the invention are attained by providing a display and warming device for food products which includes cabinet means having a frontal access opening communicating with the interior thereof. A conveyor assembly is mounted within the cabinet means and includes at least one elongated tray for holding food products. The device includes means for driving the conveyor assembly to repeatedly move the tray past the access opening.

A heating means is provided in the cabinet means for directing heat onto the food products carried by the tray so that the food products are maintained in a heated condition. The device also includes means for continuously directing a curtain of heated air upwardly between the tray and the access opening for preventing escape of heat from the cabinet.

A better understanding of the invention will be had by now referring to a preferred embodiment thereof as illustrated in the accompanying drawings, in which:

FIGURE 1 is a perspective view of the food display and warming device of the invention;

FIGURE 2 is a fragmentary perspective view of a portion of the device of FIGURE 1.

FIGURE 3 is a cross-sectional view taken in the direaction of arrows 3—3 of FIGURE 1;

Figures 4, 5:
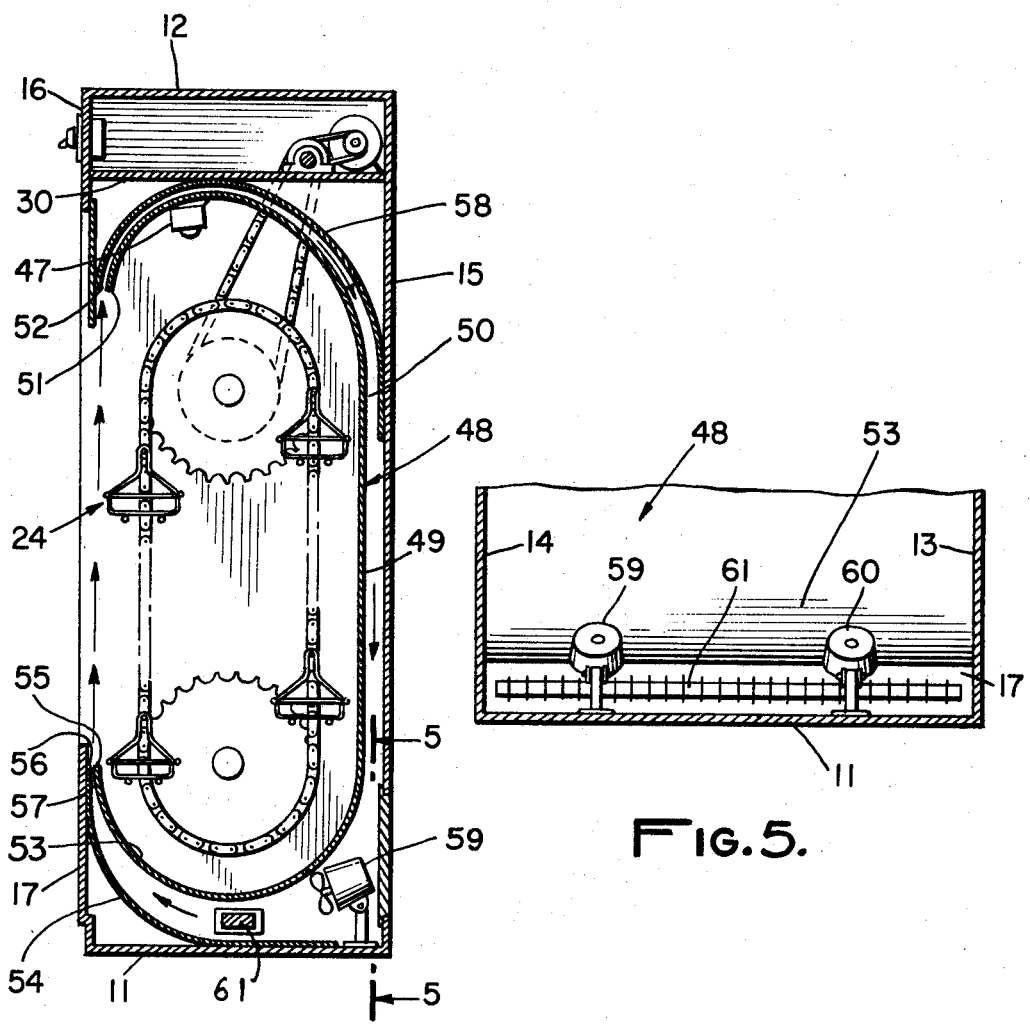
FIGURE 4 is a cross-sectional view taken in the direction of arrows 4—4 of FIGURE 1; and, FIGURE 5 is a fragmentary cross-sectional view taken in the direction of arrows 5—5 of FIGURE 4.

Referring first to FIGURE 1, there is shown a cabinet 10 having parallel bottom and top walls 11 and 12 respectively and parallel side walls 13 and 14. The rear of the cabinet 10 is closed by a rear wall 15 joined to the bottom, top and side walls. The cabinet 10 further includes a top front panel 16 joined to the top wall 12 and a bottom front panel 17 joined to the bottom wall 11. The panels 16 and 17 extend between the side walls 13 and 14. It will be seen that the panels 16 and 17 are vertically spaced apart to define a frontal access opening into the interior of the cabinet 10.

The apparatus of the invention includes a conveyor assembly for continuously moving food products past the frontal access opening of the cabinet so that the food products may be viewed for selection without requiring that the food products be moved or rearranged by the consumer. Toward that end, a pair of sprocket gears 18 and 19 are rotatably mounted on the side wall 13 in vertically spaced relation as shown. The gears 18 and 19 are coupled for concurrent rotation by a sprocket chain 20. Similarly, a pair of sprocket gears 21 and 22 are rotatably mounted on the side wall 14 opposite the gears 18 and 19. The gears 21 and 22 are coupled for concurrent rotation by a sprocket chain 23. A plurality of elongated trays 24 are mounted between the chains 20 and 23 in spaced parallel relation and are provided for holding food products. While only four trays are illustrated, it will be understood that several more may be mounted between the chains if desired.

As more clearly shown in FIGURE 2, in a typical example, the tray 24 includes a cage structure having a plurality of wires 25 along the bottom turning upwardly to define side walls terminating in rails 26 and 27. Each end of the tray 24 includes an end wire 28 looped at 29 for mounting on a pin 30 extending from the sprocket chain 23.

The conveyor assembly is adapted to be power driven for moving the trays within the cabinet. Referring to FIGURES 3 and 4, a panel 30 is mounted between the side walls 13 and 14, rear wall 15, and the front panel 16 in spaced parallel relation to the bottom and top walls 11 and 12 as shown. An electric motor 31 is mounted on the panel 30 and includes an output drive shaft 32 on which is secured a sprocket gear 33. As best shown in FIGURE 3, a shaft 34 is journaled in a pair of bearing assemblies 35 and 36 mounted on the panel 30. A sprocket gear 37 is secured on the shaft 34 and a sprocket chain 38 is mounted on the gears 33 and 37 so that the shaft 34 is rotatable by the motor 31. Sprocket gears 39 and 40 are secured on opposite ends respectively of the shaft 34 proximate to the side walls 13 and 14.

The panel 30 includes a cutout portion 41 beneath the gear 39 for receiving a sprocket chain 42 extending from the gear 39 into coupled relation with a sprocket gear 43. The gear 43 is secured to the gear 18 adjacent the side wall 13. Similarly, the panel 30 includes a cutout portion 44 beneath the gear 40 for receiving a sprocket chain 45 extending from the gear 40 into coupled relation with a sprocket gear 46. The gear 46 is secured to the gear 21 adjacent the side wall 14.

The display device includes means for maintaining the food products in a heated condition. Toward that end and with reference to FIGURE 4, an electric heater 47 is secured to the underside of a first partition 48 and may be of sufficient length to extend substantially across the width of the cabinet to direct heat downwardly onto the food products carried on the moving tray 24.

The display device includes means for providing a curtain of heated air flowing upwardly between the frontal access opening of the cabinet and the moving trays for reducing the escape of heat from the cabinet to an acceptable minimum. Toward that end and with reference to FIGURE 4, a first partition 48 is mounted between the side walls 13 and 14. The partition 48 includes a vertical portion 49 spaced from the rear wall 15 to define a portion of a duct 50 therebetween. The partition 48 extends upwardly and curves over to terminate in an end edge 51 spaced from an upper curved cowling 58 to define an inlet opening 52 therebetween. The partition 48 similarly extends downwardly and thence curves upwardly as shown at 53 in spaced relationship to a lower curved cowling 54 and terminates in an end edge 55. This edge is spaced from the end 56 of cowling 54 to define an outlet opening 57 therebetween for the duct 50.

As shown in FIGURES 4 and 5, a pair of electric fans 59 and 60 are mounted on the bottom wall 11 within the duct 50 for inducing a flow of air upwardly from the outlet opening 57 in a relatively thin curtain between the frontal access opening of the cabinet and the trays 24. A heater 61 is mounted within the duct 50 on the bottom wall 11 for heating the flow of air from the fans 59 and 60. As shown in FIGURE 5, the heater 61 may extend substantially across the width of the cabinet.

As above mentioned, the motor 31, heaters 47 and 61, and the fans 59 and 60 are adapted to be electrically powered. Referring to FIGURE 3, the device is adapted to be connected to a standard 110 volt outlet by means of a plug 62 which is connected to a control box 63 mounted in the side wall 14 as shown. It will be understood that the motor, heaters, and fans are electrically connected to the control box 63 by suitable lead wires. The control box 63 includes a switch 64 for operating the fans 59 and 60 and the heater 61. A second switch 65 is provided for operating the motor 31 and heater 47. In a preferred embodiment of the invention, the control box 63 may include a control knob 66 for adjusting a thermostatically operated control device (not shown) for maintaining the temperature in the cabinet at preselected values.

With reference to FIGURE 4, it is believed the operation of the device will be apparent. The conveyor assembly and motor are designed so that the trays 24 are moved slowly enough to permit placement and removal of food products without having to shut down the device. The heater 47 heats the interior of the cabinet to maintain the food products at a desired temperature. At the same time, the fans 59 and 60 produce a flow of air past the heater 61 so that a curtain of heated air issues from the outlet opening 57 upwardly between the frontal access opening and the moving trays. The heated air is induced to flow into the inlet opening 52 and back through the duct 50 in a continuous cycle. The upward flow of heated air serves as a "curtain" to prevent substantial escape of heat through the frontal access opening of the cabinet, and, of course, heats the interior of the cabinet in conjunction with the heater 47.

From the foregoing it will be apparent that the invention provides an efficient device for displaying food products in a heated condition. The device is designed to provide optimum accessibility to the food products without requiring that the consumer open and close doors or the like, or have to move or rearrange the food products to view the same for selection.

Various changes falling within the scope and spirit of the invention will occur to those skilled in the art. The invention is therefore not to be thought of as limited to the specific embodiment set forth.

What is claimed is:

1. A display and warming device for food products, comprising in combination:

(a) a cabinet formed with a frontal access opening communicating with the cabinet interior;
(b) a conveyor assembly mounted within the cabinet and carrying a plurality of parallel elongated trays for holding food products;
(c) driving means for driving the conveyor assembly to move the trays in a continuous path past the access opening;
(d) first heating means in the cabinet for directing heat onto food products held by the trays;
(e) air curtain means in the cabinet for circulating a curtain of air along a continuous path running upwardly between the trays and the access opening to minimize the escape of heat from the cabinet;
(f) second heating means connected to the cabinet for heating the air; and,
(g) an air duct for guiding air through its continuous path, the duct being constituted by sections of the cabinet including: a vertically extending rear cabinet wall joined to side cabinet walls, and, a bottom cabinet wall joined to the side walls and the rear wall; a partition mounted between the side walls and having a vertical portion spaced from the rear wall to define a portion of said duct therebetween, said vertical portion extending upwardly and curving over to terminate in an end edge; an upper curved cowling spaced from said partition to define with said end edge a duct inlet opening, said partition extending downwardly and curving upwardly; and, a lower curved cowling in spaced relationship to said partition to define a portion of said duct therebetween, said upwardly curved portion of said partition terminating in an end edge spaced from the end edge of said lower curved cowling to define a duct outlet opening.

2. The subject matter of claim 1 wherein the conveyor assembly includes: a first pair of sprocket gears mounted on one of said side walls, a second pair of sprocket gears mounted on the other of said side walls, a first sprocket chain coupling said first pair of gears for concurrent rotation, a second sprocket chain coupling said second pair of gears for concurrent rotation, said elongated tray including end portions coupled to said first and second chains respectively, whereby said tray is movable within said cabinet in response to rotation of said pairs of gears.

References Cited

UNITED STATES PATENTS

| | | | |
|---|---|---|---|
| 2,533,080 | 12/1950 | Alexander | 99—443 |
| 2,949,524 | 8/1960 | Scarioni | 110—179 XR |
| 3,068,775 | 12/1962 | Zehnder | 98—36 |
| 3,182,466 | 5/1965 | Beckwith | 98—36 XR |
| 3,214,566 | 10/1965 | Wilson | 99—443 XR |
| 3,273,489 | 9/1966 | Wilson | 99—447 XR |
| 3,295,434 | 1/1967 | Wilhelm et al. | 99—447 XR |
| 3,386,365 | 6/1968 | Jensen | 263—50 |

BILLY J. WILHITE, Primary Examiner

U.S. Cl. X.R.

98—36